United States Patent Office 3,341,512
Patented Sept. 12, 1967

3,341,512
BENZENE-AZO-BARBITURIC ACID DYESTUFFS
Hans E. Wegmüller and Werner Bossard, Riehen, Switzerland, assignors to J. R. Geigy A.G., Basel, Switzerland
No Drawing. Filed Aug. 17, 1964, Ser. No. 390,232
Claims priority, application Switzerland, Sept. 9, 1963, 11,094/63
7 Claims. (Cl. 260—154)

ABSTRACT OF THE DISCLOSURE

A group of dyestuffs is provided which are especially suitable for dyeing polyethylene glycol terephthalate fibers to yield dyeings of excellent fastness properties. The dyestuffs are characterized chemically by the presence of the nucleus

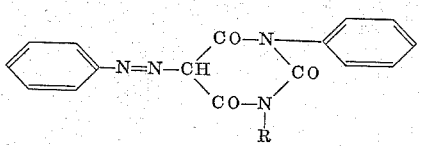

wherein the phenyl moieties are substituted as hereinafter specified, and R is lower alkyl or lower alkoxyalkyl. Methods of preparing the new dyes and of dyeing therewith are also disclosed.

---

This invention relates in a first aspect, to new, difficultly water-soluble dyestuffs suitable for the dyeing of polyethylene glycol terephthalate fibers and of textile materials made therefrom.

"Dyeing" as used in this specification also comprises pad-dyeing and printing.

In the dyeing of polyethylene glycol terephthalate type textile polyester fibers and fabrics made therefrom, it has been a special problem that dyeings with disperse dyes which are fast to light and sublimation, and at the same time satisfactorily reserve cellulose and natural polyamide fibers, especially cotton or wool, are difficult to obtain, because those dyestuffs which promise to fulfill the above requirements, often do not draw sufficiently on the aforesaid terephthalate type fibers, and/or lack depth of color; on the other hand, dyestuff which draw satisfactorily on the last-mentioned fibers often lack some or all of the first-mentioned properties.

It is also known that non-sulfonated disperse dyes of the benezene-azo-barbituric acid series, especially when substituted at the benezene nucleus, e.g. by alkoxy or aryloxy radicals, and dyestuffs of the benzene-azo-thiobarbituric acid series, especially those which are substituted at the benzene nucleus by a nitro group, are valuable dyes for hydrolyzed and also for unhydrolyzed cellulose acetate, cellulose propionate and others, as well as for mixed organic acid esters of cellulose.

Generally, the disperse dyes falling under the second of the above series, cannot be used for the dyeing of polyethylene glycol terephthalate fibers because they do not withstand the conditions of dyeing of the latter fibers, especially in the so-called high temperature dyeing process which requires dyeing at temperatures above 100° C. under excess pressure, while on the other hand the known disperse dyes of the first-mentioned benzene-azo-barbituric acid series generally lack drawing power and/or depth of color in dyeings on polyethylene glycol terephthalate fibers to such an extent that they are not commercially useful for dyeing these fibers.

"Polyethylene glycol terephthalate type" polyester fibers as used in this specification, comprise such well known terephthalate and iso-phthalate fibers as Terylene, Kodel, Vycron and the like.

We have now found that a narrow group of non-sulfonated benzene-azo-barbituric acid dyestuffs which fall under the formula

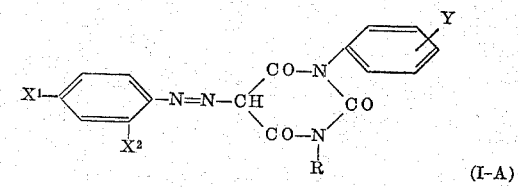

wherein

One of $X^1$ and $X^2$ represents lower alkoxy, especially methoxy or ethoxy; ω-hydroxy-lower alkoxy, especially β-hydroxy-ethoxy, or γ-hydroxy-propoxy; ω-lower alkoxy-lower alkoxy, especially β-methoxy-ethoxy, γ-methoxy-propoxy, β-ethoxy-ethoxy, or γ-ethoxy-propoxy; phenoxy, methylphenoxy or chlorophenoxy, And the other X represents hydrogen, lower alkyl, especially methyl, chlorine, bromine or nitro;

Y represents hydrogen, lower alkyl, especially methyl, lower alkoxy, especially methoxy or ethoxy, chlorine, bromine or nitro, and R represents lower alkyl or lower alkoxy-lower alkyl, are eminently suited for the dyeing of polyethylene glycol terephthalate type fibers from aqueous dispersions on account of their high affinity for those fibers, dyeings obtained with dyestuffs falling under Formula I–A which contain a nitro or phenoxy radical in the diazo component being also particularly fast to sublimation; while dyestuffs falling under Formula I–A which have a nitro group in ortho-position to the azo bridge possess additionally outstanding fastness to light. Moreover, the dyestuffs show good reserve on wool and cotton, and are very well suited for combination with blue disperse dyes and yield in such mixtures dyeings of level green shades, fast to light.

The term "lower" as used in this specification and in the appended claims in connection with alkyl or alkoxy means that these radicals have from 1 to 4 carbon atoms.

Other specific problems are created in the well-known high-temperature dying of polyethylene glycol terephthalate type fibers, namely, about 100° C. under pressures above atmospheric, especially when the use of swelling agents is to be dispensed with. Under these high temperature conditions many otherwise satisfactory disperse dyes fail to show satisfactory drawing power on the aforesaid fibers. In these cases, there is danger that the dyestuff particles in aqueous dispersions of such disperse dyes will agglomerate and excess of dyestuff which has not properly drawn on the fibers, will be deposited thereon and will thus detrimentally influence the fastness properties of the resulting dyeings on polyethylene glycol terephthalate fiber materials, especially fastness to crocking and to organic solvents.

We have now found that dyes of the formula

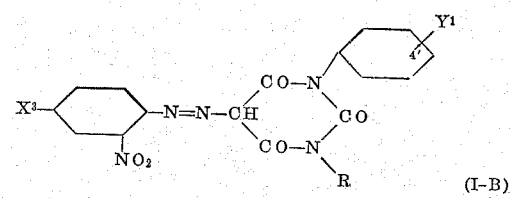

wherein

R has the same meaning as in Formula I–A $X^3$ represents lower alkoxy, especially methoxy or ethoxy, or phenoxy, and $Y^1$ represents hydrogen, lower alkyl, especially methyl or ethyl, lower alkoxy, especially methoxy or ethoxy, chlorine, bromine or nitro, are distinguished as polyterephthalate fiber dyes because they possess excellent drawing power on these fibers equally in the carrier dyeing process below 100° C. with the use of swelling agents as well as under the conditions of the high temperature process outlined above. The dyeings obtained therewith possess very good fastness to light and to sublimation, to crocking and to organic solvents; they reserve cotton and wool well; moreover in mixture with blue dyestuffs they yield dyeings of level green shades, an advantage which is lacking in many of the known disperse polyterephthalate fiber dyes.

These good dyeing properties of the dyestuffs of Formula I-B on polyethylene glycol terephthalate type fibers are particularly unexpected, since the aforesaid dyestuffs are of no practical value as cellulose ester dyes, for they do not possess any practically useful drawing power on such fibers.

The compounds of Formulas I-A and I-B and other valuable azo dyestuffs which are difficultly soluble in water and fall also under the general formula

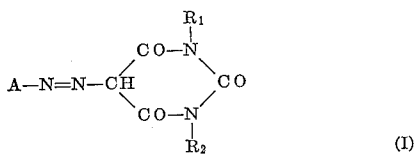

are produced by coupling the diazonium salt of an amine of the formula

with a coupling component of the formula

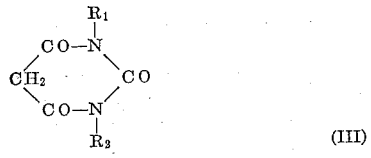

In these formulas

A represents a homocyclic-aromatic radical, and each of $R_1$ and $R_2$ represents an unsubstituted or non-ionogenically substituted alkyl, cycloalkyl, aralkyl or phenyl radical.

The components are so chosen that the dyestuff does not contain any salt-forming, water solubilizing groups which dissociate acid in water, i.e., for example, it contains neither sulfonic acid groups, carboxyl groups nor o,o'-dihydroxyazo groupings.

The homocyclic-aromatic radical symbolized by A is, for example, an unsubstituted or non-ionogenically substituted phenyl or naphthyl radical. Preferably, substituents of the phenyl radical are electrophilic, for example, halogens up to the atomic number 35, chlorine or bromine, the cyano, nitro or trifluoromethyl group, acyl groups, lower alkylsulfonyl or arylsulfonyl groups, also carboxylic acid ester groups, sulfonic acid aryl ester groups and sulfonic acid amide groups. The phenyl radical, however, can also contain nucleophilic groups, in particular combined with electrophilic substituents, e.g. aliphatic groups such as low unsubstituted alkyl groups or those substituted by the hydroxyl group, low alkoxy groups or by halogen such as fluorine, chlorine or bromine; aromatic groups, ether groups, i.e. low alkoxy or aryloxy groups, or acylamino groups.

As acyl groups, preferably carbacyl radicals particularly low alkanoyl radicals such as the acetyl or propionyl radical, or aroyl radicals such as the benzoyl radical are used. Examples of acylamino groups are low alkanoylamino radicals such as the acetylamino radical, carbalkoxyamino radical such as the carbomethoxyamino and carbethoxyamino radicals, aroylamino radicals, e.g. the benzoylamino radical or alkylsulfonylamino radicals, e.g. the methylsulfonylamino radical or arylsulfonylamino radicals such as the phenylsulfonylamino radical.

If the phenyl radical symbolized by A contains a phenylazo group then this is preferably in the p-position to the azo bond. In addition to this group, the phenyl radical A can contain other substituents, in particular low alkyl or alkoxy groups, halogens such as fluorine, chlorine or bromine, or acylamino groups, preferably low alkanoylamino groups; preferably however, the phenyl radical A contains no further substituents or low alkyl groups. The phenylazo group is preferably unsubstituted, but it can also contain halogens such as chlorine or bromine or low alkyl, low alkoxy groups or the nitro group.

If A represents a naphthyl radical, then it can be an unsubstituted as well as a substituted 1- or 2-naphthyl radical. Substituents thereof are mainly low alkyl and alkoxy groups, halogens such as chlorine or bromine, sulfonic acid amide groups which may be N-substituted, sulfonic acid aryl ester, alkylsulfonyl or arylsulfonyl groups. The aromatic rings occurring in the above substituents are preferably of the benzene series and they can be substituted as defined.

If A is a heterocyclic-aromatic radical, then it is mainly the radical of a 5- or 6-membered heterocyclo, particularly one containing nitrogen, which heterocycle can contain a fused benzene ring. Preferably it is the radical of a heterocycle containing a ring nitrogen atom in a position adjacent to the azo bond, which radical is of the thiazole, oxadiazole, pyrazole, benzothiazole or indazole series.

Also the heterocyclic radicals can contain substituents, e.g. nucleophilic substituents such as low alkyl groups which may be substituted by the hydroxyl or alkoxy groups, or aryl groups, preferably phenyl groups, or electrophilic substituents such as low alkylsulfonyl groups or low halogenoalkylsulfonyl groups, the nitro, cyano or thiocyano group, or halogens such as fluorine, chlorine or bromine.

In the preferred dyestuffs of Formula I, A is an electrophilically substituted homocyclic-aromatic radical, in particular a phenyl radical.

If $R_1$ and $R_2$ each represent an alkyl radical, then this preferably has 1 to 4 carbon atoms. As defined, this alkyl radical can be substituted; in particular the hydroxyl group, low alkoxy groups such as the methoxy or ethoxy group, low alkanoyloxy groups such as the acetoxy or propionyloxy group, also the cyano group as well as halogens such as chlorine or bromine can be mentioned as alkylsubstituents. When $R_1$ and $R_2$ contain halogens and hydroxyl groups and low alkoxy groups as components, these must be separated from the nitrogen atom by at least two carbon atoms.

Cycloalkyl and aralkyl groups in the positions of $R_1$ and $R_2$ are in particular the cyclohexyl or the benzyl group.

If $R_1$ and $R_2$ are an aralkyl or phenyl radical, then the aromatic rings of these radicals can contain the substituents mentioned above in the description of A with the exception of phenylazo groups; that is, for example, low alkyl, low alkoxy groups, the nitro or cyano group or halogens up to the atomic number of 35 such as fluorine, chlorine or bromine.

In preferred dyestuffs of Formula I, one of the $R_1$ and $R_2$ is an alkyl radical, in particular a low alkyl radical, the other is a phenyl radical which may be non-ionogenically substituted.

The coupling component of Formula III is obtained, for example, by condensation of a urea of the formula

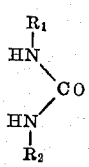

with malonic acid, advantageously in an inert organic solvent such as chloroform, in the presence of an agent which splits off water, e.g. in the presence of phosphorus oxychloride, or by reaction of the above N,N'-disubstituted urea with cyanoacetic acid to form the corresponding cyanoacetyl urea, conversion of this in an alkaline medium to form the 4-aminouracil and saponification of the imino group to the oxo group, e.g. with boiling diluted hydrochloric acid.

The diazonium salt of an amine of Formula II is coupled with the coupling component of Formula III by the usual methods, preferably in a mineral acid to weakly acid aqueous medium, in particular at a pH of 4 to 4.5. If the coupling is made in a mineral acid medium, the acid is advantageously buffered, e.g. with alkali metal salts of low fatty acids.

According to another aspect of the invention, we have found that non-metallizable dyestuffs which are free from water-solubilizing groups which dissociate acid in water, and fall under the formula

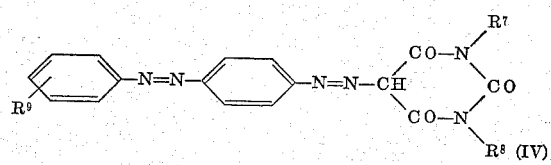

wherein $R^7$ represents lower alkyl, lower alkoxy-lower alkyl, chloro-lower alkyl, bromo-lower alkyl, or cyano-lower alkyl, $R^8$ represents lower alkyl, lower alkoxy-lower alkyl, phenyl, lower alkyl-phenyl, lower alkoxy-phenyl, chlorophenyl or bromo-phenyl, and $R^9$ represents hydrogen or straight chain lower alkyl, are as equally well suited for the dyeing of polyethylene glycol terephthalate type polyester fibers as the dyestuffs falling under Formulas I-A and I-B, described under the first aspect of this invention, and afford the same advantages during dyeing; the dyeings obtained therewith on the aforesaid fibers have similarly good properties as those of Formulas I-A and I-B, respectively.

Preferred disazo dyestuffs of Formula IV which are distinguished by particularly good drawing power on polyethylene glycol terephthalate type polyester fibers and stability in aqueous dispersions especially under the dyeing conditions outlined under the first aspect of this invention, as well as fastness to sublimation of the dyeings obtained therewith, are those dyestuffs falling under Formula IV, in which $R^8$ represents phenyl, lower alkyl-phenyl, lower alkoxy-phenyl, chloro- or bromo-phenyl, and $R^7$ represents lower alkyl or lower alkoxy-lower alkyl.

The dyestuffs of Formula IV are obtained by the same processes as outlined hereinbefore but using as the amine of Formula II a p-aminosubstituted azo-benzene.

The dyestuffs according to both aspects of the invention are brought into a finely dispersed form by milling with dispersing agents. Suitable dispersing agents are, e.g. anionic dispersing agents such as alkylaryl sulfonates, condensation products of formaldehyde and naphthalene sulfonic acids, lignin sulfonates, or non-ionogenic dispersing agents such as fatty alcohol polyglycol ethers. Advantageously mixtures of the anionic and non-ionogenic dispersing agents mentioned are used.

When so prepared, the dyestuffs according to the invention are suitable for the dyeing of polyethylene glycol terephthalate type fibers from an aqueous dispersion.

Polyglycol terephthalate fibers are dyed with aqueous dispersions of the dyestuffs according to the invention preferably at temperatures of over 100° C. under pressure above atmospheric, preferably at 0.5 to 4 atmospheres excess pressure. Dyeing can also be performed, however, under ambient pressure at the boiling point of the dyebath in the presence of carriers such as phenylphenol, polychlorobenzene compounds or similar auxiliaries, or pad dyeing can be performed on the foulard followed by thermofixing at 180–210° C.

On the fibers mentioned, the dyestuffs according to the invention produce greenish yellow, yellow and orange dyeings which have excellent fastness to washing, milling, sublimation, light, rubbing, perspiration, solvents, crossdyeing, decatizing, gas fading and industrial fumes. In addition, vegetable and animal fibers, particularly cotton or wool, are very well reserved by the dyestuffs according to the invention. Also, they can be evenly dyed with the usual commercial carriers. Good and evenly penetrated dyeings are obtained with these dyestuffs even on closely woven fabric or tightly twisted yarns.

The following non-limitative examples illustrate the invention. Where not expressly otherwise stated, parts and percentages are given by weight. The temperatures are in degrees centigrade. The relationship of parts by weight to parts by volume is that of grams (g.) to milliliters (ml.).

*Example 1*

A fine suspension of 17.3 parts of 1-amino-2-nitro-4-chlorobenzene in 300 parts of water and 30 parts of 36% hydrochloric acid is diazotized at 0–5° by pouring in a solution of 6.9 parts of sodium nitrite in 50 parts of water. The clear diazonium salt solution is added dropwise at 0–5° to a solution of 27.6 parts of 1-phenyl-3-γ-methoxypropyl barbituric acid in 1250 parts of water and 250 parts of 80% acetic acid. The pH of the reaction mixture is then buffered with sodium acetate to 4–4.5. The yellow coupling product, the composition of which corresponds to the formula

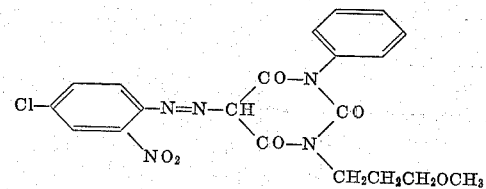

is filtered off, washed neutral with dilute sodium carbonate solution and then washed free of salt with water. The dyestuff is dried in vacuo at 60–70° and afterwards milled with a mixture of lignin sulfonate and the sodium salt of a condensation product of naphthalene-2-sulfonic acid and formaldehyde. Polyethylene glycol terephthalate fibers can be dyed with the dye preparation so obtained from an aqueous dispersion, if desired in the presence of a carrier such as the sodium salt of o-phenylphenol, in pure greenish yellow shades. The dyeings have very good fastness to washing, rubbing, light and sublimation.

The 1-phenyl-3-γ-methoxyphopyl barbituric acid used in this example as coupling component is obtained, for example, by reacting N-phenyl-N'-γ-methoxypropyl urea with malonic acid in chloroform, in the presence of phosphorus oxychloride.

*Example 2*

A fine suspension of 16.8 parts of 1-amino-2-nitro-4-methoxybenzene in 500 parts of water, 60 parts of 36% hydrochloric acid and 5 parts of cetyl polyglycol ether is diazotised in the usual way at 0–5° by the addition of 6.9 parts of sodium nitrite. The diazonium salt solution is clarified and, at 0–5°, is added to a solution of 21.8 parts of 1-phenyl-3-methyl barbituric acid in 800 parts of water and 200 parts of 80% acetic acid. The pH of the coupling bath is then raised to 4-4.5 by the addition of sodium acetate. On completion of the coupling, the yellow precipitate formed, the composition of which corresponds to the formula

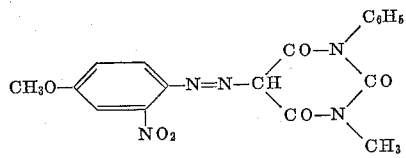

is filtered off, washed with a lot of water and dried in vacuo at 60-70°. After milling with the sodium salt of a condensation product of naphthalene-2-sulfonic acid and formaldehyde, the dyestuff so obtained dyes polyglycol terephthalate fibers from an aqueous dispersion, optionally in the presence of a carrier such as the sodium salt of o-phenylphenol, in pure yellow shades. The dyeings have very good fastness to washing, rubbing, light and sublimation.

Dyestuffs which have similar properties are obtained of the diazo components given in column 2 of the following Table I are coupled under the conditions described in the above example with the equimolecular amount of one of the coupling components given in column 3.

TABLE I

| Ex. No. | Diazo component | Coupling component | Shade on polyglycol terephthalate fibers |
|---|---|---|---|
| 3 | 1-amino-2-nitro-4-methylbenzene. | 1-phenyl-3-γ-methoxy-propyl barbituric acid. | Greenish Yellow. |
| 4 | ___do___ | 1-phenyl-3-benzyl barbituric acid. | Do. |
| 5 | ___do___ | 1-phenyl-3-β-chloro-ethyl barbituric acid. | Do. |
| 6 | ___do___ | 1-phenyl-3-β-cyano-ethyl barbituric acid. | Do. |
| 7 | 1-amino-2-nitro-4-chlorobenzene. | 1-(3'-chlorophenyl)-3-ethyl barbituric acid. | Do. |
| 8 | ___do___ | 1-(2'-methylphenyl)-3-ethyl barbituric acid. | Do. |
| 9 | 1-amino-2-nitro-4-methoxybenzene. | 1-phenyl-3-ethyl barbituric acid. | Yellow. |
| 10 | ___do___ | 1-(4'-chlorophenyl)-3-methyl barbituric acid. | Do. |
| 11 | ___do___ | 1-(2'-methoxy-phenyl)-3-ethyl barbituric acid. | Do. |
| 12 | ___do___ | 1-phenyl-3-cyclohexyl barbituric acid. | Do. |
| 13 | 1-amino-2-methyl-4-nitrobenzene. | 1-phenyl-3-methyl barbituric acid. | Greenish Yellow. |
| 14 | 1-amino-2-methoxy-4-nitrobenzene. | ___do___ | Do. |
| 15 | ___do___ | 1-(3'-chlorophenyl)-3-3-methyl barbituric acid. | Do. |
| 16 | ___do___ | 1-(3'-methylphenyl)-3-β-chloroethyl barbituric acid. | Do. |
| 17 | 1-amino-2-ethoxy-4-nitrobenzene. | 1-phenyl-3-methyl barbituric acid. | Do. |
| 18 | ___do___ | 1-(3'-methylphenyl)-3-methyl barbituric acid. | Do. |
| 19 | 1-amino-2-nitro-4-ethoxybenzene. | 1-phenyl-3-methyl barbituric acid. | Yellow. |
| 20 | 1-amino-2-nitro-4-phenoxy-benzene. | ___do___ | Do. |
| 21 | ___do___ | 1-phenyl-3-butyl barbituric acid. | Do. |

*Example 22*

A fine suspension of 16.8 parts of 1-amino-2-methoxy-4-nitrobenzene in 500 parts of water, 60 parts of 36% hydrochloric acid and 5 parts of oleyl polyglycol ether is diazotised in the usual way by the addition of 6.9 parts of sodium nitrite. The diazonium salt solution is clarified and, at 0-5°, is added dropwise to a solution of 23.2 parts of 1-phenyl-3-ethyl barbituric acid in 750 parts of water and 250 parts of 80% acetic acid. The pH of the reaction mixture is then buffered to 4-4.5 by the addition of sodium acetate. The yellow coupling product, the composition of which corresponds to the formula

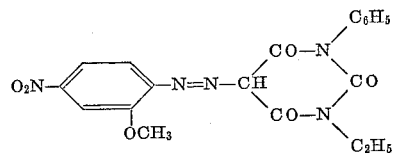

is filtered off, washed neutral with dilute sodium carbonate solution and finally free of salt with water. The dyestuff is dried at 60-70° in vacuo and afterwards brought into a finely dispersed form by milling with a mixture of lignin sulfonate and the sodium salt of a naphthalene sulfonic acid/formaldehyde condensation product.

It dyes polyglycol terephthalate fibers by the usual dyeing methods in pure greenish yellow shades which have good fastness properties.

*Example 23*

2 parts of the dyestuff prepared according to Example 2 are dispersed in 4000 parts of water. 20 parts of the sodium salt of o-phenylphenol as swelling agent as well as 20 parts of diammonium sulfate are added to this dispersion which is then used to dye 100 parts of polyethylene glycol terephthalate yarn for 90 minutes at 95 to 98°. The dye liquor is almost completely exhausted. The dyeing is rinsed with water and then after-treated for 15 minutes at 80° with 12 parts of 30%-sodium hydroxide solution and 4 parts of octylphenyl polyglycol ether in 4000 parts of water. Finally the dyed material is again thoroughly rinsed with water and dried.

In this manner, a yellow dyeing is obtained which is fast to washing, light and sublimation.

When, in the above example, the 20 parts of the sodium salt of o-phenylphenol are replaced by 20 parts of one of the following commercially available swelling agents, namely 20 parts of o-phenylphenol emulsion, or
20 parts of p-chlorophenoxyethanol emulsion, or
20 parts of dichlorobenzene emulsion, or
20 parts of cresotic acid methyl ester emulsion, or by
20 parts of a 1:1 emulsion of terephthalic acid dimethyl ester and benzanilide, while all other conditions are the same as in the above example, yellow dyeings of equal quality are obtained.

When, in the above example, the 100 parts of polyethylene glycol terephthalate yarn are replaced by 100 parts of polyethylene glycol isophthalate yarn or 100 parts of polycyclohexanediol terephthalate fibers and dyeing is performed under the same conditions as before, yellow dyeings of equal quality are obtained.

Dyeings of similarly good quality are obtained when, in the above example, the 2 parts of the dyestuff prepared according to Example 2 are replaced by 2 parts of the dyestuff prepared as described in Examples 3 to 22, or the dyestuff prepared as described in Example 1.

*Example 24*

In a pressure dyeing apparatus, 2 parts of the dyestuff obtained as described in Example 22 are finely suspended in 2000 parts of water containing 4 parts of oleyl polyglycol ether. The pH of the dyebath is adjusted to 6-6.5 with acetic acid.

100 parts of polyglycol terephthalate fabric are introduced at 50°, the bath is heated in an autoclave within 30 minutes to 140° and dyeing is performed for 50 minutes at this temperature. The dyeing is then rinsed with water, soaped and dried. Under these conditions, a pure greenish yellow dyeing is obtained which is fast to washing, perspiration, light and sublimation. The dyestuffs described in the other examples produce dyeings of equal quality by this process.

Example 25

Polyglycol terephthalate fabric (such as "Dacron" of E. I. du Pont de Nemours, Wilmington, Delaware, U.S.A.) is impregnated in a foulard at 40° with a liquor of the following composition:

20 parts of the dyestuff obtained according to Example 1, finely dispersed in

| | Parts |
|---|---|
| Sodium alginate | 7.5 |
| Triethanolamine | 20 |
| Octyl phenol polyglycol ether | 20 |
| and | |
| Water | 900 |

The fabric is squeezed out to about 100% liquor content, dried at 100° and the dyeing is fixed for 30 seconds at a temperature of 210°. The dyed goods are rinsed with water, soaped and dried. Under these conditions, a pure yellow dyeing is obtained which is fast to washing, rubbing, light and sublimation.

The dyestuffs described in the other examples produce dyeings of equal quality by this process.

Example 26

A fine suspension of 16.8 parts of 1-amino-2-nitro-4-methoxy-benzene in 500 parts of water, 60 parts of 36%-hydrochloric acid and 5 parts of cetyl polyglycol ether is diazotized in the usual way at 0 to 5° by the addition of 6.9 parts of sodium nitrite.

Separately, 25.3 parts of 1-(3'-chlorophenyl)-3-methyl-barbituric acid are dissolved in 300 parts of water by the addition of 8 parts of sodium hydroxide. The alkaline 1-(3'-chlorophenyl)-3-methyl-barbituric acid solution is added dropwise at 0 to 5° to the prepared diazonium salt solution. Then the pH-value of the coupling bath is adjusted to 4 to 4.5 by the addition of sodium acetate. On the completion of the coupling reaction, the yellow precipitate corresponding to the formula

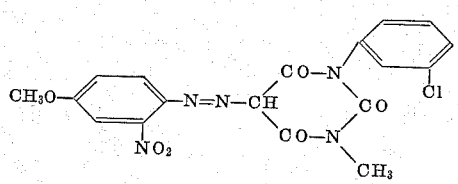

is separated by filtration, washed with water and dried in vacuo at 70 to 80°. 10 parts of the coupling product thus obtained are brought into fine water-dispersible form by milling them together with the sodium salt of a condensation product of naphthalene-2-sulfonic acid formaldehyde and 10 parts of a lignin sulfonate. The aqueous dispersion of the dyestuff worked up in this manner is very stable and when used in particular for dyeing polyethylene glycol terephthalate slubbings, yarn and fabrics at 125° to 130° under pressure, it has no tendency to precipitate.

The 1-(3'-chlorophenyl)-3-methylbarbituric acid used as coupling component in this example is prepared, for instance, by reacting N-(3'-chlorophenyl)-N'-methylurea with cyanoacetic acid to form the corresponding cyano-acetyl urea, converting the cyano-acetyl urea with sodium hydroxide to form 1-(3'-chlorophenyl)-3-methyl-4-amino-uracil and then splitting off the amino group in diluted boiling hydrochloric acid. Pure 1-(3'-chlorophenyl)-3-methyl-barbituric acid having a melting point of 162 to 163° is obtained from the crude product by crystallization from ethanol.

Dyestuffs of similar properties are obtained when the diazo components listed in column 2 of the following Table II are reacted under the conditions described above with one of the coupling components mentioned in column 3 and when the resulting coupling products are brought under the above-described conditions into fine water-dispersible form.

TABLE II

| Ex. No. | Diazo component | Coupling component | Shade on polyethylene-glycol-terephthalate fibers |
|---|---|---|---|
| 27 | 1-amino-2-nitro-4-methoxy-benzene. | 1-(2'-methylphenyl)-3-methyl-barbituric acid. | Yellow. |
| 28 | ——do—— | 1-(3',4'-dichlorophenyl)-3-methyl-barbituric acid. | Do. |
| 29 | ——do—— | 1-(4'-bromophenyl)-3-methoxypropyl-barbituric acid. | Do. |
| 30 | ——do—— | 1-(4'-chlorophenyl)-3-ethyl-barbituric acid. | Do. |
| 31 | ——do—— | 1-(3'-methylphenyl)-3-n-propyl-barbituric acid. | Do. |
| 32 | 1-amino-2-nitro-4-ethoxy-benzene. | 1-(3'-methylphenyl)-3-methyl-barbituric acid. | Do. |
| 33 | ——do—— | 1-(3'-nitrophenyl)-3-methyl-barbituric acid. | Do. |
| 34 | ——do—— | 1-(2'-methyl-5'-chlorophenyl)-3-methyl-barbituric acid. | Do. |
| 35 | ——do—— | 1-(2',4'-dimethylphenyl)-3-methyl-barbituric acid. | Do. |
| 36 | ——do—— | 1-(2'-methoxyphenyl)-3-methyl-barbituric acid. | Do. |
| 37 | 1-amino-2-nitro-4-phenoxy-benzene. | 1-(2'-methylphenyl)-3-methyl-barbituric acid. | Do. |
| 38 | ——do—— | 1-(3'-chlorophenyl)-3-methyl-barbituric acid. | Do. |
| 39 | 1-amino-2-nitro-4-methyl-benzene. | ——do—— | Greenish-yellow. |
| 40 | ——do—— | 1-(4'-ethylphenyl)-3-ethyl-barbituric acid. | Do. |
| 41 | ——do—— | 1-(2',4'-dimethylphenyl)-3-methyl-barbituric acid. | Do. |
| 42 | 1-amino-2-nitro-4-ethylbenzene. | 1-(3'-bromophenyl)-3-methyl-barbituric acid. | Do. |
| 43 | 1-amino-2-methyl-4-nitrobenzene. | 1-(4'-methylphenyl)-3-methyl-barbituric acid. | Do. |
| 44 | ——do—— | 1-(4'-methylphenyl)-3-isopropyl-barbituric acid. | Do. |
| 45 | 1-amino-2-ethyl-4-nitrobenzene. | ——do—— | Do. |
| 46 | 1-amino-2-methoxy-4-nitrobenzene. | ——do—— | Do. |
| 47 | ——do—— | 1-(2'-chlorophenyl)-3-methyl-barbituric acid. | Do. |
| 48 | ——do—— | 1-(3'-methylphenyl)-3-propyl-barbituric acid. | Do. |
| 49 | ——do—— | 1-(3'-nitrophenyl)-3-methyl-barbituric acid. | Do. |
| 50 | ——do—— | 1-(2'-ethoxyphenyl)-3-propyl-barbituric acid. | Do. |
| 51 | 1-amino-2-ethoxy-4-nitrobenzene. | ——do—— | Do. |
| 52 | ——do—— | 1-(2'-chlorophenyl)-3-methyl-barbituric acid. | Do. |
| 53 | ——do—— | 1-(2'-methoxy-5'-methyl)-3-methyl-barbituric acid. | Do. |
| 54 | 1-amino-2-nitro-4-bromobenzene. | ——do—— | Do. |
| 55 | ——do—— | 1-(2'-methylphenyl)-3-methyl-barbituric acid. | Do. |

Example 56

3 parts of the dyestuff prepared according to Example 37 are dispersed in 4000 parts of water. 20 parts of the sodium salt of o-phenylphenol as swelling agent as well as 20 parts of diammonium sulfate are added to the dispersion which is then used to dye for 90 minutes at 95 to 98°, 100 parts of polyethylene glycol terephthalate yarn. The dyeing is rinsed and then aftertreated for 15 minutes at 80° with 12 parts of 30%-sodium hydroxide solution and 4 parts of octylphenyl polyglycol ether in 4000 parts of water. Subsequently, the dyed yarn is again thoroughly rinsed with water and dried. In this manner, a pure yellow dyeing is obtained which has very good fastness to light.

When, in the above example, the 100 parts of polyethylene glycol terephthalate yarn are replaced by 200 parts of a blended fabric consisting of cotton and polyethylene glycol terephthalate (ratio 1:1), while the other conditions are maintained, the polyethylene glycol terephthalate threads are dyed in the same pure yellow as above while the cotton threads are very well reserved.

The dyestuffs described in the other examples have similar good qualities in reserving cotton when used to dye a blended cotton/polyethylene glycol terephthalate fabric.

Example 57

3 parts of the dyestuff prepared according to Example 27 are dispersed in 4000 parts of water. 20 parts of the sodium salt of o-phenylphenol as swelling agent as well as 20 parts of diammonium phosphate are added to this dispersion which is then used to dye for 90 minutes at 95 to 98°, 200 parts of a blended fabric consisting of 55% of wool and 45% of polyethylene glycol terephthalate. The dyeing is rinsed with water and then aftertreated for 15 minutes at 60° with 4 parts of octylphenyl polyglycol ether in 4000 parts of water. Then the dyed fabric is again thoroughly rinsed with water and dried. Under these conditons, the polyethylene glycol terephthalate fibers of the blended fabric are dyed in a pure yellow shade while the woollen portion is well reserved.

The dyestuffs described in the other examples have similar good properties in reserving the woollen part when used for the dyeing of blended wool/polyethylene glycol terephthalate fabrics.

Example 58

1 part of the dyestuff obtained according to Example 47 as well as 3 parts of the dyestuff of the formula

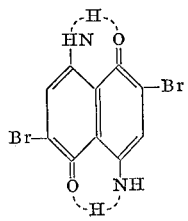

prepared according to Example 1 of U.S. Patent 2,553,048 are dispersed in 4000 parts of water. 20 parts of the sodium salt of o-phenylphenol as swelling agent as well as 20 parts of diammonium sulfate are added to this dispersion which is then used to dye for 90 minutes at 95 to 98°, 100 parts of polyethylene glycol terephthalate yarn. The dyeing is rinsed and aftertreated in the same way as in Example 56 with diluted sodium hydroxide solution and octylphenyl polyglycol ether. In this manner, a level green dyeing is obtained which has very good fastness to washing, rubbing and light.

When, in the above example, the 20 parts of the sodium salt of o-phenylphenol are replaced by 20 parts of one of the following commercially available agents, namely.

20 parts of o-phenylphenol emulsion, or
20 parts of p-chlorophenoxyethanol emulsion, or
20 parts of dichlorobenzene emulsion, or
20 parts of cresotic acid methyl ester emulsion, or by
20 parts of a 1:1 emulsion of terephthalic acid dimethyl ester and benzanilide while the other conditions remain unchanged, green dyeings of equal quality are obtained.

Combination of the above blue bromo-naphthoxidine dyestuff with dyestuffs described in the other examples yields also equal green dyeings of good fastness to light.

Example 59

0.5 part of the dyestuff obtained according to Example 26 are dispersed in 1000 parts of water in a pressure dyeing apparatus. 0.5 part of oleic acid N-methyltauride, 0.5 part of the sodium salt of a condensation product of naphthalene-2-sulfonic acid and formaldehyde, 2 parts of diammonium sulfate as well as 0.1 part of 85%-formic acid are added to this dispersion.

25 parts of densely wound polyethylene glycol terephthalate yarn are introduced at 50°, the closed bath is heated within 45 minutes to 125 to 130° and is maintained at this temperature for another 45 minutes while the goods are being dyed under pressure. The dyebath is well exhausted. The dyeing is rinsed with water, soaped and dried. A yellow dyeing is obtained which has good fastness to washing, rubbing, perspiration, light, sublimation and solvents, and which is free from any visible dyestuff residue.

Similar good results are obtained when, in the above example, the 0.5 part of the dyestuff prepared according to Example 26 is replaced by 0.5 part of the dyestuffs prepared according to the Examples 27 to 55 and dyeing is performed under the conditions described above on polyethylene glycol terephthalate, polycyclohexane diolterephthalate or polyethylene glycol isophthalate slubbings, yarn or fabric.

Example 60

In a pressure dyeing apparatus, 0.5 part of the dyestuff prepared according to Table I, Example 7, as well as 3 parts of the dyestuff of the formula

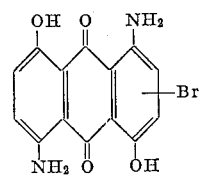

prepared according to Example 1 of German Patent 1,029,506 are dispersed in 2000 parts of water. 4 parts of oleyl polyglycol ether are added to this dispersion, and the pH-value of the dyebath is adjusted with acetic acid to 6 to 6.5.

Then, 100 parts of polyethylene glycol terephthalate yarn are introduced at 50°, the bath in the closed pressure apparatus is heated within 45 minutes to 125 to 130° and maintained at this temperature for another 45 minutes while dyeing is performed. The dyeing is then rinsed with water, soaped and dried. Under these conditions, level green dyeings are obtained which have good fastness to washing, perspiration, sublimation and rubbing.

Example 61

Polyethylene glycol terephthalate fabric is printed on a printing machine at 25° with a liquor of the following composition:

50 parts of the dyestuff prepared according to Example 31 finely dispersed in

| | Parts |
|---|---|
| Water | 300 |
| Urea | 40 |
| Crystal gum thickener | 400 | and

10% aqueous p-phenylphenol emulsion _____ 200

The printed fabric is steamed for 60 minutes at 100° and then soaped, rinsed with water and dried.

A yellow colored printing is obtained which has very good fastness to washing, rubbing, light and sublimation.

A printing of similar good quality is obtained when in the above example the 200 parts of 10% p-phenylphenol emulsion are replaced by 200 parts of water and the printed fabric is steamed for 30 minutes under a pressure of 1.5 atmospheres above ambient pressure or fixed for 1 minute in a hot air current having a temperature of 210° C.

The dyestuffs described in the other examples preparing them give color printings of similar quality when applied according to this method to polyethylene glycol terephthalate fabrics.

Example 62

Polyethylene glycol terephthalate fabric is impregnated on a foulard at 40° with a bath of the following composition:

20 parts of the dyestuff prepared according to Example 36, finely dispersed in

|  | Parts |
|---|---|
| Sodium alginate | 7.5 |
| Triethanolamine | 20 |
| Octylphenyl polyglycol ether | 20 |
| and |  |
| Water | 900 |

The fabric is squeezed to about 100% moisture content, dried at 100° and then fixed for 30 seconds with air at a temperature of 210°. The dyed goods are then rinsed with water, soaped and dried. Under these conditions, a yellow dyeing is obtained which is fast to washing, rubbing, light, and sublimation.

Example 63

A fine suspension of 19.7 parts of 4-aminoazobenzene in 500 parts of water, 75 parts of 36% hydrochloric acid and 5 parts of oleyl polyglycol ether is diazotised in the usual way at 15-20° by the addition of 6.9 parts of sodium nitrite. The clarified diazonium salt solution is added dropwise at 0-5° to a solution of 27.2 parts of 1,3-bis-(γ-methoxypropyl)-barbituric acid in 1200 parts of water and 200 parts of 80% acetic acid. The pH of the coupling bath is then adjusted to 4.5–5 by the addition of sodium acetate. The reaction mixture is then stirred for 10 hours at 5–10° to complete the coupling. The orange precipitate formed, the composition of which corresponds to the formula

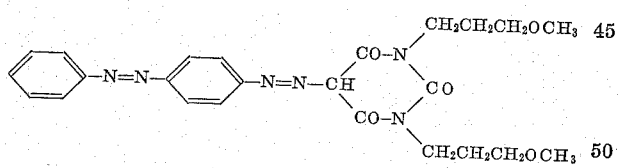

is filtered off, washed with water and dried in the usual way. 5 parts of the dyestuff so obtained are brought into a finely dispersed form by milling with 12 parts of the sodium salt of a condensation product of naphthalene-2-sulfonic acid and formaldehyde. Polyglycol terephthalate fibers can be dyed in pure golden yellow shades with this dye preparation from an aqueous dispersion, optionally in the presence of a carrier such as sodium-o-phenyl-phenolate. The dyeings have very good fastness to perspiration, rubbing and light.

The 1,3-bis-(γ-methoxypropyl)-barbituric acid used in this example as coupling component is obtained by known methods, for example, by reacting N,N'-bis-(γ-methoxypropyl)-urea with cyano-acetic acid to form the corresponding cyanoacetyl urea, conversion of the cyanoacetyl urea into 1,3-bis-(γ-methoxypropyl)-4-amino uracil by means of sodium hydroxide and then splitting off the amino group in dilute boiling hydrochloric acid.

Dyestuffs having similar properties are obtained if the diazo components given in column 2 of the following Table III are coupled under the conditions described in the above example with one of the coupling components given in column 3.

TABLE III

| Ex. No. | Diazo component | Coupling component | Shade on polyglycol terephthalate fibers |
|---|---|---|---|
| 64 | 4-aminoazobenzene | 1-phenyl-3-methylbarbituric acid. | Golden yellow. |
| 65 | ----do---- | 1-phenyl-3-γ-methoxypropyl-barbituric acid. | Do. |
| 66 | ----do---- | 1,3-dibutyl-barbituric acid. | Do. |
| 67 | ----do---- | 1-phenyl-3-butyl-barbituric acid. | Do. |
| 68 | ----do---- | 1-phenyl-3-β-chloroethyl-barbituric acid. | Do. |
| 69 | ----do---- | 1-phenyl-3-β-bromoethyl-barbituric acid. | Do. |
| 70 | ----do---- | 1-phenyl-3-β-cyanoethyl-barbituric acid. | Do. |
| 71 | ----do---- | 1-(3'-chlorophenyl)-3-methyl-barbituric acid. | Do. |
| 72 | ----do---- | 1-(2'-methylphenyl)-3-methyl-barbituric acid. | Do. |
| 73 | ----do---- | 1-(4'-ethoxy-phenyl)-3-methyl-barbituric acid. | Do. |
| 74 | ----do---- | 1-(2',4'-dimethylphenyl)-3-propyl-barbituric acid. | Do. |
| 75 | ----do---- | 1-(4'-ethylphenyl)-3-methyl-barbituric acid. | Do. |
| 76 | ----do---- | 1-(3',4'-dichlorophenyl)-3-ethyl-barbituric acid. | Do. |
| 77 | ----do---- | 1-(2'-methoxy-5-methylphenyl)-3-methyl-barbituric acid. | Do. |
| 78 | 4'-methyl-4-aminoazobenzene. | 1-(2'-bromophenyl)-3-isopropyl-barbituric acid. | Do. |
| 79 | ----do---- | 1-phenyl-3-methoxypropyl-barbituric acid. | Do. |
| 80 | 3'-methyl-4-aminoazobenzene. | ----do---- | Do. |
| 81 | ----do---- | 1-(3'-methylphenyl)-3-propyl-barbituric acid. | Do. |
| 82 | 2'-methyl-4-aminoazobenzene. | 1-(3'-chlorophenyl)-3-methyl-barbituric acid. | Do. |
| 83 | 4'-ethyl-4-aminoazobenzene. | ----do---- | Do. |
| 84 | 3'-methyl-4-aminoazobenzene. | 1-(2'-methoxyphenyl)-3-propyl-barbituric acid. | Do. |

Example 85

4 parts of the dyestuff prepared according to Example 72 are dispersed in 4000 parts of water. 20 parts of the sodium salt of o-phenylphenol as swelling agent as well as 20 parts of diammonium sulfate are added to this dispersion which is then used to dye for 90 minutes at 95 to 98°, 100 parts of polyethylene glycol terephthalate yarn.

The dyeing is rinsed and then after-treated for 15 minutes at 80° with 12 parts of 30% sodium hydroxide solution and 4 parts of actylphenol polyglycol ether in 4000 parts of water. Finally the dyed material is again thoroughly rinsed with water and then dried. In this way, a deep golden-yellow dyeing is obtained which has good fastness to light and sublimation.

When in the above example the 20 parts of the sodium salt of o-phenylphenol are replaced by 20 parts of one of the following commercially available swelling agents, namely, 20 parts of o-phenylphenol emulsion, or
20 parts of p-chlorophenoxyethanol emulsion, or
20 parts of dichlorobenzene emulsion, or
20 parts of cresotic acid methyl ester emulsion, or by 20 parts of a 1:1 emulsion of terephthalic acid methyl ester and benzanilidine, while the other conditions remain unchanged, a golden-yellow dyeing of equal quality is obtained.

Under the same conditions as above, the dyestuffs described in the Examples 63 to 71 and 73 to 84 yield dyeings of similar quality when applied to polyethylene glycol terephthalate yarn.

Example 86

2 parts of the dyestuff prepared according to Example 1 are dispersed in 4000 parts of water. 20 parts of the sodium salt of o-phenylphenol as swelling agent as well as 20 parts of diammonium phosphate are added to this dispersion which is then used to dye for 90 minutes at 95 to 98°, 200 parts of a blended fabric consisting of 50% cotton and 50% of polyethylene glycol terephthalate. The dye bath is almost exhausted. Then the dyeing is rinsed with water, soaped and dried. Under these conditions, the polyethylene glycol terephthalate threads of the blended fabric are dyed in a golden-yellow shade, while the cotton part is well reserved.

The dyestuffs described in the Examples 63 to 70 and 72 to 84 have similar properties in dyeing the polyethylene glycol terephthalate fibers and reserving the cotton fibers of blended fabrics consisting of these materials.

Example 87

0.5 part of the dyestuff prepared according to Example 71 is dispersed in a pressure dyeing apparatus in 1000 parts of water. 0.5 part of oleic acid N-methyl lauride, 0.5 part of the sodium salt of a condensation product of naphthalene-2-sulfonic acid formaldehyde, 2 parts of diammonium sulfate as well as 0.1 part of 85% formic acid are added to this dispersion.

Then 25 parts of densely wound polyethylene terephthalate yarn are introduced at 50°, the closed bath is heated within 45 minutes to 125 to 130° and maintained at this temperature for another 45 minutes while dyeing is performed. Then the dyeing is rinsed with water, soaped and dried. A golden-yellow dyeing is obtained which is fast to washing, rubbing, sweat, light, sublimation and solvents.

Similar good results are obtained when in the above example the 0.5 part of the dyestuff prepared according to Example 71 is replaced by 0.5 part of each of the dyestuffs prepared according to the Examples 64 to 70 and 72 to 84, and are applied under the above conditions to polyethylene glycol terephthalate, polyglycohexane diolterephthalate or polyethylene glycol isophthalate slubbings, yarn or fabric.

Example 88

0.5 part of the dyestuff prepared according to Example 79 as well as 3 parts of the dyestuff of the formula

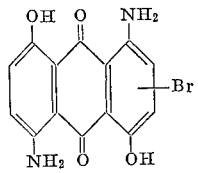

prepared according to Example 1 of German Patent 1,029,506 are dispersed in 2000 parts of water in a pressure dyeing apparatus. 4 parts of oleyl polyglycol ether are added, and the pH-value of the dyebath is adjusted to 6 to 6.5 with acetic acid.

Now 100 parts of polyethylene glycol terephthalate yarn are introduced at 50°, the closed bath is heated within 45 minutes to 125 to 130° and maintained for another 45 minutes at this temperature while dyeing is performed. Then the dyeing is rinsed with water, soaped and dried. Under these conditions level green dyeing is obtained which has good fastness to washing, sublimation and rubbing.

Example 89

On a printing machine, polyethylene glycol terephthalate fabric is printed at 25° with a printing paste of the following composition:

50 parts of the dyestuff prepared according to Example 67 finely dispersed in

| | Parts |
|---|---|
| Water | 300 |
| Urea | 40 |
| Crystal gum thickener | 400 |
| and | |
| 10% aqueous p-phenylphenol emulsion | 200 |

The printed fabric is then steamed for 60 minutes at 100° and then soaped, rinsed with water and dried.

In this way, a golden-yellow color printing is obtained which has very good fastness to washing, rubbing, light and sublimation.

A printing of similar good properties is obtained when in the above example the 200 parts of 10% p-phenylphenol emulsion are replaced by 200 parts of water and the printed fabric is steamed for 30 minutes under a pressure of 1.5 atmospheres above ambient pressure, or the printed fabric is fixed for 1 minute in a hot air stream at a temperature of 210°.

The dyestuffs described in the other examples yield color printings of similar quality when applied according to this method to polyethylene glycol terephthalate fabrics.

Example 90

Polyethylene glycol terephthalate fabric is impregnated on a foulard at 40° with a liquor of the following composition:

20 parts of the dyestuff prepared according to Example 67 finely dispersed in

| | Parts |
|---|---|
| Sodium alginate | 7.5 |
| Triethanolamine | 20 |
| Octylphenyl polyglycol ether | 20 |
| and | |
| Water | 900 |

The fabric squeezed to about 100% is dried at 100° and then fixed for 30 seconds at a temperature of 210°. The dyed goods are then rinsed with water, soaped and dried. Under these conditions a golden-yellow dyeing is obtained which has good fastness to washing, rubbing, light and sublimation.

Example 91

A fine suspension of 18.5 parts of 1-amino-4-phenoxybenzene in 500 parts of water, 60 parts of 36% hydrochloric acid and 5 parts of cetyl polyglycol ether is diazotised in the usual way at 0–5° by the addition of 6.9 parts of sodium nitrite. The diazonium salt solution is clarified and, at 0–5°, is added to a solution of 21.8 parts of 1-phenyl-3-methyl barbituric acid in 800 parts of water and 200 parts of 80% acetic acid. The pH of the coupling bath is then raised to 4–4.5 by the addition of sodium acetate. On completion of the coupling, the yellow precipitate formed, the composition of which corresponds to the formula

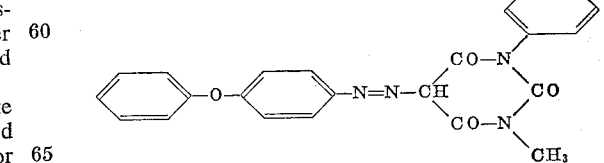

is filtered off, washed with a lot of water and dried in vacuo at 60–70°. After milling with the sodium salt of a condensation product of naphthalene-2-sulfonic acid and formaldehyde, the dyestuff so obtained dyes polyglycol terephthalate fibers from an aqueous dispersion, optionally in the presence of a carrier such as the sodium salt of o-phenylphenol, in pure greenish yellow shades. The dyeings have very good fastness to washing, rubbing, light and sublimation.

Dyestuffs which have similar properties are obtained if the diazo components given in column 2 of the following Table IV are coupled under the conditions described in the above example with the equimolecular amount of one of the coupling components given in column 3.

TABLE IV

| Ex. No. | Diazo component | Coupling component | Shade on polyglycol terephthalate fibers |
|---|---|---|---|
| 92 | 1-amino-2-methoxy-benzene. | 1-phenyl-3-methoxy-propyl-barbituric acid. | Greenish yellow. |
| 93 | 1-amino-2-ethoxy-benzene. | ____do____ | Do. |
| 94 | 1-amino-2-hydroxyethoxy-benzene. | 1-phenyl-3-butyl-barbituric acid. | Do. |
| 95 | 1-amino-2-β-methoxyethoxy-benzene. | ____do____ | Do. |
| 96 | 1-amino-2-phenoxy-benzene. | 1-(3'-methoxyphenyl)-3-methyl-barbituric acid. | Do. |
| 97 | 1-amino-2-(2'-methylphenoxy)-benzene. | ____do____ | Do. |
| 98 | 1-amino-2-(3'-chlorophenoxy)-benzene. | 1-phenyl-3-propyl-barbituric acid. | Do. |
| 99 | 1-amino-2-methoxy-4-ethyl-benzene. | ____do____ | Do. |
| 100 | 1-amino-2-ethoxy-4-methyl-benzene. | ____do____ | Do. |
| 101 | 1-amino-2-phenoxy-4-chloro-benzene. | 1-(4'-methylphenyl)-3-butyl-barbituric acid. | Do. |
| 102 | 1-amino-4-methoxy-benzene. | 1-(3'-nitrophenyl)-3-methyl-barbituric acid. | Do. |
| 103 | ____do____ | 1-(2'-nitrophenyl)-3-methyl-barbituric acid. | Do. |
| 104 | 1-amino-4-ethoxy-benzene. | 1-(3'4'-dichlorophenyl)-3-ethyl-barbituric acid. | Do. |
| 105 | 1-amino-4-γ-hydroxypropoxy-benzene. | 1-(2'-chlorophenyl)-3-propyl-barbituric acid. | Do. |
| 106 | 1-amino-4-γ-ethoxypropoxy benzene. | 1-(4'-ethylphenyl)-3-methyl-barbituric acid. | Do. |
| 107 | 1-amino-4-phenoxy-benzene. | 1-phenyl-3-methoxy-propyl-barbituric acid. | Do. |
| 108 | ____do____ | 1-(3'-chlorophenyl)-3-methyl-barbituric acid. | Do. |
| 109 | ____do____ | 1-(2'-methylphenyl)-3-methyl-barbituric acid. | Do. |
| 110 | 1-amino-4-(3'-methylphenoxy)-benzene. | ____do____ | Do. |
| 111 | 1-amino-4-(2'-ethylphenoxy)-benzene. | 1-phenyl-3-methyl-barbituric acid. | Do. |
| 112 | 1-amino-4-(4'-chlorophenoxy)-benzene. | ____do____ | Do. |
| 113 | 1-amino-2-methyl-4-methoxy-benzene. | 1-(4'-ethoxyphenyl)-3-methyl-barbituric acid. | Do. |
| 114 | 1-amino-2-bromo-4-ethoxy-benzene. | 1-phenyl-3-isopropyl-barbituric acid. | Do. |
| 115 | 1-amino-2-chloro-4-hydroxyethoxy-benzene. | ____do____ | Do. |
| 116 | 1-amino-2-methyl-4-phenoxy-benzene. | 1-phenyl-3-ethyl-barbituric acid. | Do. |
| 117 | 1-amino-4-ethoxy-benzene. | 1-(3'-bromophenyl)-3-methyl-barbituric acid. | Do. |
| 118 | 1-amino-2-phenoxy-4-nitrobenzene. | 1-phenyl-3-methyl-barbituric acid. | Do. |
| 119 | ____do____ | 1-(2'-methylphenyl)-3-butyl-barbituric acid. | Do. |

Example 120

2 parts of the dyestuff prepared according to Example 91 are dispersed in 4000 parts of water. 20 parts of the sodium salt of o-phenylphenol as swelling agent as well as 20 parts of diammonium phosphate are added to the dispersion which is then used to dye for 90 minutes at 95 to 98°, 100 parts of polyethylene glycol terephthalate yarn. The dyeing is rinsed and then aftertreated for 15 minutes at 80° with 12 parts of 30%-sodium hydroxide solution and 4 parts of octyl phenyl polyglycol ether in 4000 parts of water. Subsequently, the dyed yarn is again thoroughly rinsed with water and dried. In this manner, a greenish yellow dyeing is obtained which has a very good fastness to light and sublimation.

Example 121

0.5 part of the dyestuff obtained according to Example 108 are dispersed in 1000 parts of water in a pressure dyeing apparatus. 0.5 part of oleic acid N-methyltauride, 0.5 part of the sodium salt of a condensation product of naphthalene-2-sulfonic acid and formaldehyde, 2 parts of diammonium sulfate as well as 0.1 part of 85%-formic acid are added to this dispersion.

25 parts of densely wound polyethylene glycol terephthalate yarn are introduced at 50°, the closed bath is heated within 45 minutes to 125 to 130° and is maintained at this temperature for another 45 minutes while the goods are being dyed under pressure. The dyebath is exhausted. The dyeing is rinsed with water, soaped and dried. A yellow dyeing is obtained which has good fastness to washing, rubbing, perspiration, light, sublimation and solvents, and which is free from any visible dyestuff residue.

Similar good results are obtained when, in the above example, the 0.5 part of the dyestuff prepared according to Example 108 is replaced by 0.5 part of the dyestuff prepared according to the Examples 91, 107 and 109–119 and dyeing is performed under the conditions described above on polyethylene glycol terephthalate, polycyclohexane diolterephthalate or polyethylene glycol isophthalate slubbings, yarn or fabric.

Example 122

In a pressure dyeing apparatus, 0.5 part of the dyestuff prepared according to Example 96, as well as 3 parts of the dyestuff of the formula

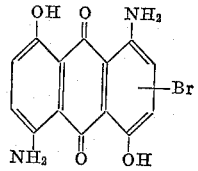

are dispersed in 2000 parts of water. 4 parts of oleyl polyglycol ether are added to this dispersion, and the pH-value of the dyebath is adjusted with acetic acid to 6 to 6.5.

Then, 100 parts of polyethylene glycol terephthalate yarn are introduced at 50°, the bath in the closed pressure apparatus is heated within 45 minutes to 125 to 130° and maintained at this temperature for another 45 minutes while dyeing is performed. The dyeing is then rinsed with water, soaped and dried. Under these conditions, level green dyeings are obtained which have good fastness to washing, perspiration, sublimation and rubbing.

Example 123

Polyethylene glycol terephthalate fabric is printed on a printing machine at 25° with a printing paste of the following composition:

50 parts of the dyestuff prepared according to Example 104, finely dispersed in

| | Parts |
|---|---|
| Water | 300 |
| Urea | 40 |
| Crystal gum thickener | 400 |
| and | |
| 10% aqueous p-phenylphenol emulsion | 200 |

The printed fabric is steamed for 60 minutes at 100° and then soaped, rinsed with water and dried.

A yellow color printing is obtained which has very good fastness to washing, rubbing and light.

A printing of similar good quality is obtained when the above example the 200 parts of 10% p-phenylphenol emulsion are replaced by 200 parts of water and the printed fabric is steamed for 30 minutes under a pressure of 1.5 atmospheres above ambient pressure or fixed for 1 minute in a hot air current having a temperature of 210°.

The dyestuffs described in the other preparatory examples give color printings of similar quality when applied according to this method to polyethylene glycol terephthalate fabrics.

The dyestuffs of Examples 1, 3 to 8 inclusive, 39 to 42 inclusive, 54 and 55 afford dyeings on polyethylene glycol terephthalate fibers which are distinguished by very good light fastness. However, the drawing power of these dyestuffs on said fibers leaves something to be desired.

Dyestuffs of Examples 13, 43, 44 and 45 lack satisfactory drawing power on the said fiber materials and the dyeings obtained therewith are not distinguished by particularly good fastness properties. These dyestuffs are mentioned to show the criticality of changes in the structure of dyestuffs of this general class in regard to suitability as polyethylene glycol terephthalate fiber dyes.

We claim:
1. A dyestuff of the formula

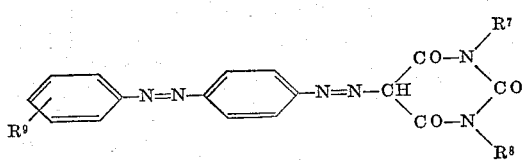

wherein
$R^7$ is a member selected from the group consisting of lower alkyl, lower alkoxy-lower alkyl, chloro-lower alkyl, bromo-lower alkyl and cyano-lower alkyl,
$R^8$ is a member selected from the group consisting of lower alkyl, lower alkoxy-lower alkyl, phenyl, lower alkyl-phenyl, lower alkoxy-phenyl, chloro-phenyl and bromo-phenyl, and
$R^9$ is a member selected from the group consisting of hydrogen and straight chain lower alkyl.

2. A dyestuff of the formula

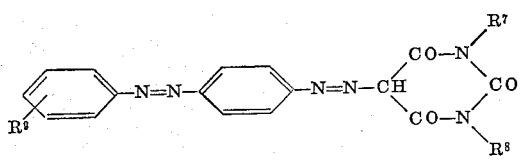

wherein
$R^7$ is a member selected from the group consisting of lower alkyl and lower alkoxy-lower alkyl,
$R^8$ is a member selected from the group consisting of phenyl, lower alkyl-phenyl, lower alkoxy-phenyl, chloro-phenyl and bromo-phenyl, and
$R^9$ is a member selected from the group consisting of H and straight chain lower alkyl.

3. A dyestuff of the formula

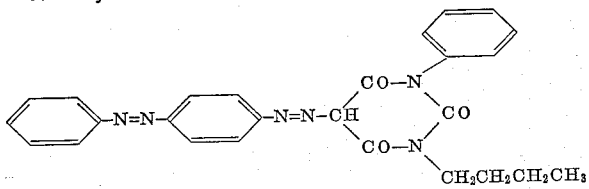

4. A dyestuff of the formula

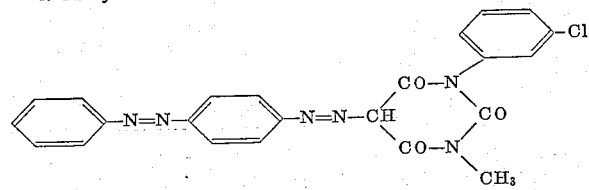

5. A dyestuff of the formula

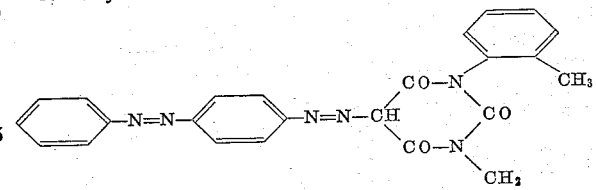

6. A dyestuff of the formula

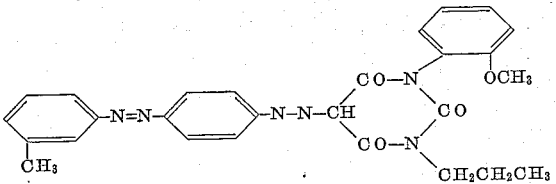

7. A dyestuff of the formula

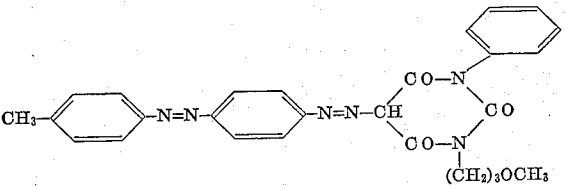

References Cited
UNITED STATES PATENTS
2,216,446   10/1940   McNally et al. _____ 260—154 XR CHARLES B. PARKER, *Primary Examiner.*

F. D. HIGEL, *Assistant Examiner.*